United States Patent
Weiblen et al.

[11] Patent Number: 5,507,186
[45] Date of Patent: Apr. 16, 1996

[54] PRESSURE SENSOR

[75] Inventors: Kurt Weiblen, Metzingen; Werner Herden, Gerlingen; Uwe Lipphardt; Horst Muenzel, both of Reutlingen; Matthias Kuesell, Kornwestheim; Steffen Schmidt, Reutlingen, all of Germany

[73] Assignee: Robert Bosch GmbH, Stuttgart, Germany

[21] Appl. No.: 260,585

[22] Filed: Jun. 16, 1994

[30] Foreign Application Priority Data

Jun. 22, 1993 [DE] Germany .......................... 43 20 594.1

[51] Int. Cl.$^6$ ............................ G01L 9/00; G01L 7/00
[52] U.S. Cl. .................... 73/723; 73/720; 73/721; 73/727; 73/756
[58] Field of Search .................... 73/723, 727, 744, 73/745, 746, 756, 720, 721

[56] References Cited

U.S. PATENT DOCUMENTS 5,249,468  10/1993  Benedikt et al. .................... 73/706

FOREIGN PATENT DOCUMENTS 4103704  1/1992  Germany.
4106102  9/1992  Germany.

Primary Examiner—Richard Chilcot
Assistant Examiner—Paul D. Amrozowicz
Attorney, Agent, or Firm—Kenyon & Kenyon

[57] ABSTRACT

In a pressure sensor, a force is transferred via a pressure plunger end made of relatively hard material onto a measurement element including a sensor membrane on a support. The sensor membrane is part of a micromechanical arrangement made of silicon. A metal structure made of a metal of lower hardness compared with the hardness of the material of the pressure plunger end is applied onto the sensor membrane. This metal structure can be impressed and plastically deformed with increased force by the contact surface of the pressure plunger end, in such a way that conforming contact of the contact surface is achieved, and potential angular errors are compensated for.

7 Claims, 2 Drawing Sheets

PRESSURE SENSOR

FIELD OF THE INVENTION

The present invention relates to a pressure sensor, and more particularly, to a pressure sensor for detecting pressure in a combustion chamber of an internal combustion engine.

BACKGROUND OF THE INVENTION

German Patent Application No. DE-OS 41 06 102 shows a pressure sensor including a pressure plunger, located in a sensor housing, that can be acted upon by the pressure being measured and guided in a linearly displaceable fashion such that one end of the pressure plunger rests orthogonally on a sensor membrane. The sensor membrane is part of a micromechanical arrangement made of silicon. The sensor membrane is deflected when acted upon by pressure, thus generating an analyzable measurement signal corresponding to the pressure introduced by the pressure plunger. A measurement signal is detected piezoresistively via a bridge circuit, and analyzed in an attached electronics unit.

In the above arrangement, it is necessary to apply the force of the pressure plunger onto the sensor membrane in as well-defined and homogeneous a manner as possible so as not to produce any measurement errors due to inaccurate conformity between the contact surface of the plunger end and the sensor membrane surface, or due to additional transverse stresses in the sensor membrane. This can result from tolerances and angular errors in the orthogonal alignment of the pressure plunger on the sensor membrane, or from irregularities in the contact surfaces.

The above-document contains several proposals to eliminate this problem. In a first embodiment, the entire pressure plunger is manufactured from soft material, so that its contact surface adapts conformingly to the sensor membrane. This conflicts, however, with the need for a pressure plunger of high rigidity. In a further embodiment, therefore, it is proposed that the plunger be produced, for the greater part of its length, from glass ceramic constituting a relatively hard material with low thermal conductivity, with only the end region being made from a relatively soft metal, for example aluminum, brass, copper, or plastic. To do so, however, it is necessary to extend the pressure plunger at its end with soft material, which is relatively complex and entails additional tolerance problems.

In a further embodiment, an intermediate element is arranged on the sensor membrane to convey the force of the pressure plunger into the sensor membrane homogeneously and with an accurately defined contact surface. This intermediate element is made of borosilicate glass or also of silicon, and has a high-quality surface finish. The intermediate element is bonded to the sensor membrane anodically or directly. With the intermediate element made of relatively hard material, homogeneous force application and a defined contact surface are achieved by accurate alignment and high surface quality, with relatively high manufacturing complexity.

SUMMARY OF THE INVENTION

In contrast, in the pressure sensor according to the present invention, metal structures are applied onto the sensor membrane cost-effectively in a batch process. By using a metal of lower hardness as compared with the hardness of the material of the pressure plunger end, the metal structure at the contact surface can be plastically deformed, by application of an increased pressure to the pressure plunger, so that the contact surface of the pressure plunger end rests conformingly against the metal structure and therefore against the sensor membrane, since there is no continuous metal layer. As a result of this impression and conforming contact, pressure is conveyed homogeneously into the sensor membrane via the pressure plunger. Angular errors, or rough and uneven surfaces of the pressure plunger end, are compensated for by the conforming contact.

In accordance with the present invention, the metal structure has a broad range of selectable compressive strength, and in contrast to polymeric and other plastics, achieves very high strength values over a very wide temperature range. In addition, there is very little tendency toward creep.

The coefficient of thermal expansion is low, and can be adapted, by selecting the metal or alloy, to that of the material of the sensor membrane, made in particular of silicon.

In accordance with an embodiment of the present invention, a micromechanical arrangement of the sensor membrane and support are made of silicon and the metal structure is applied galvanically as an integral part of the production process. The metal structure preferably has a film thickness of 10 to 100 μm. To allow impression with plastic deformation even at relatively low force levels, the metal structure is formed with metal elevations and intervals lying between them, for example as a grid of metal bumps or concentric rings.

When impression occurs, the metal elevations expand laterally into the intervals on either side. When the individual structural elements touch one another, the force required for further impression rises very steeply.

Appropriate selection of the ratio between metal-covered and free surface can be used to predefine the permanent metal film thickness at which impression is stopped.

DETAILED DESCRIPTION OF THE INVENTION

Figure 1:
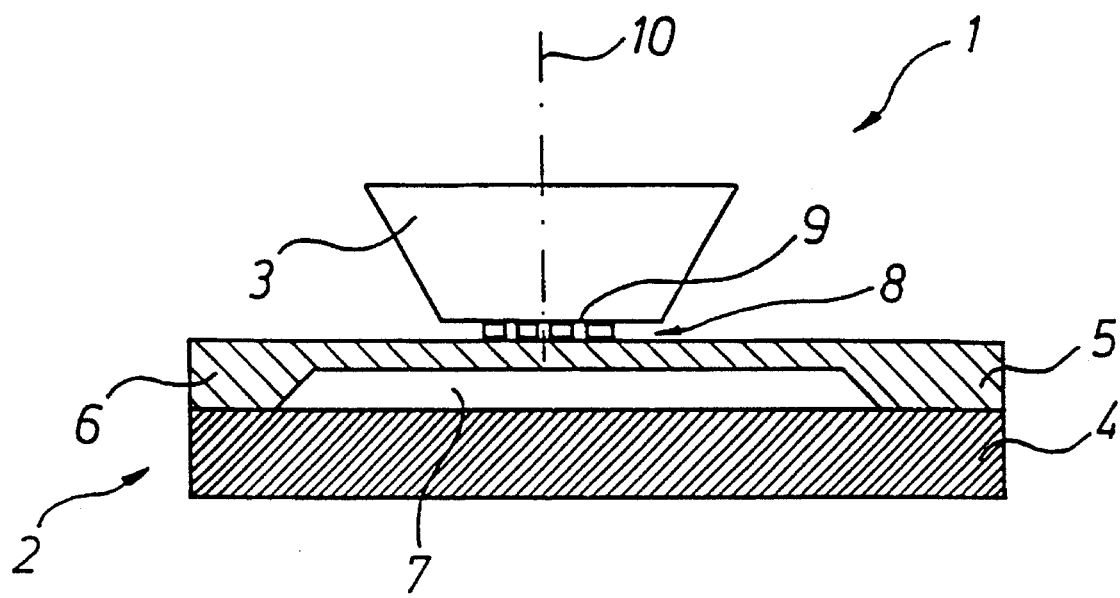
FIG. 1 shows a section through a region of a pressure sensor, with a sensor membrane and a pressure plunger end placed thereon.
Figure 2:
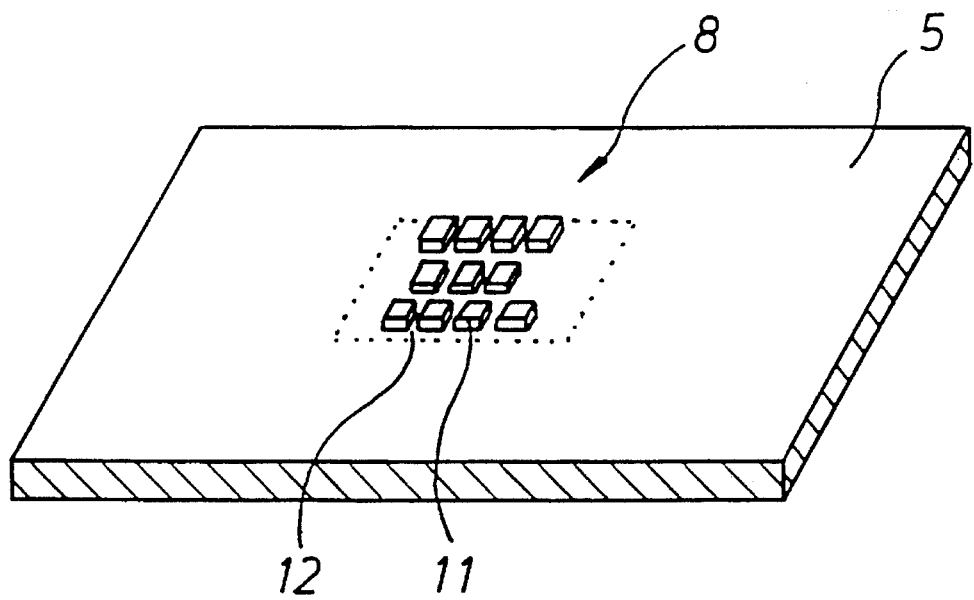
FIG. 2 shows a perspective view of part of the sensor membrane with an applied metal structure.

FIG. 1 depicts part of a pressure sensor 1 in section, with a measurement element 2 and a conical pressure plunger end 3 of a pressure plunger (not depicted further).

Measurement element 2 includes a silicon wafer 4 as support and a sensor membrane 5 applied thereonto. Sensor membrane 5 is a micromechanical component and preferably produced by etching; it is supported in a side region 6 on silicon wafer 4 and spans a space 7 over silicon wafer 4 in a center region. When acted upon by pressure, the supported sensor membrane 5 deflects into this space 7. The deflection can generate an analyzable measurement signal, preferably by the use of a piezoresistive or piezoelectric effect, which is analyzed in an electronics unit (not depicted further) and associated with a specific pressure. A metal structure 8, onto which a contact surface 9 of pressure plunger end 3 is placed, is applied onto the surface of sensor membrane 5 in the region above space 7. Axis 10 of the pressure plunger is orthogonal to sensor membrane 5; the pressure to be measured is applied in the direction of axis 10.

Metal structure 8 is applied galvanically, as a thin metal film with a uniform thickness of between 10 and 100 µm, onto sensor membrane 5, and subsequently structured by means of a masking technique in such a way that parts of the metal film are etched away. Alternatively, after application of a thin metal starting layer and a thick, structured lacquer layer, it is selectively applied galvanically into the openings in the lacquer layer (selective application). Application of the metal layer and structuring can be integrated into the production process for the overall micromechanical structure.

Metal structure 8 in FIG. 1 is embodied as a grid, with square metal elevations constituting metal bumps 11 that are arranged at mutual intervals 12. The metal structure and thus the force application are preferably located approximately in the center of the membrane, so as to produce bending stresses in response to the resistance.

Figure 4:
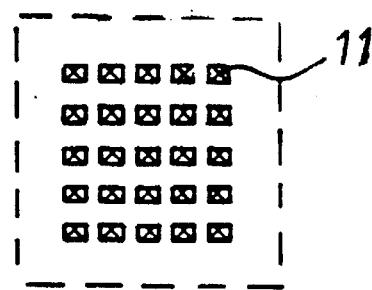
Figure 5:
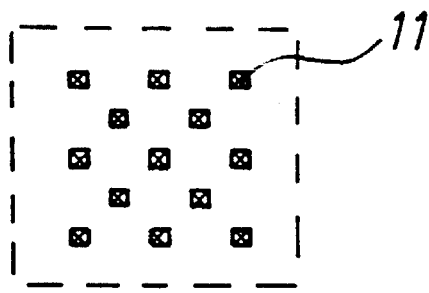
Figure 6:
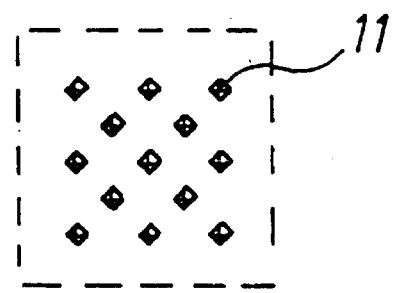

The ratio between metal-covered and free surface, and the dimensions of the metal bumps 11 and the intervals 12, can be varied depending on conditions and applications. In this connection, FIG. 4 depicts, as a further exemplary embodiment, a metal structure with a relatively large number of metal bumps 11 with a small surface area and small intervals. FIGS. 5 and 6, however, show arrangements of metal bumps of similar surface area, but with large intervals. The common feature of these grid arrangements is that the contact surface 9 of pressure plunger end 3 is supported on a plurality of metal bumps 11.

Figure 3:
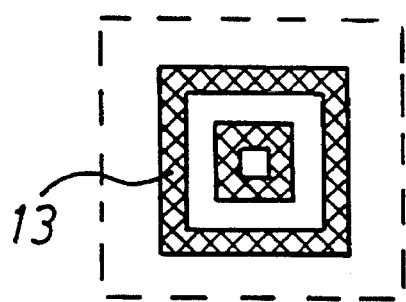
FIGS. 3 to 7 show plan views of various embodiments of the metal structure.
Figure 7:
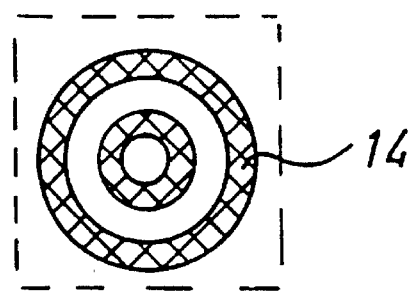

In accordance with another embodiment of the present invention, the metal structure is embodied by webs in the form of concentric rings arranged at intervals. In FIG. 3, it includes concentric rings 13 that are square in plan view, and in FIG. 7, concentric circular rings 14. The number of rings, web widths, and intervals can once again be adapted to different conditions and applications.

The pressure plunger and thus pressure plunger end 3 as depicted are made of ceramic material, metal, or hard metal. Metal structure 8 or metal bumps 11 and rings 13, 14 are produced from a comparatively softer material, such as gold, copper, nickel, chromium, or alloys thereof.

For alignment and adaptation, pressure plunger end 3 is placed with its contact surface 9 on metal structure 8, and metal structure 8 is impressed by increased pressure on the pressure plunger so that it adapts to the shape of contact surface 9. As a result, potential irregularities in contact surface 9, and angular errors, are conformingly absorbed by metal structure 8. When the force applied for impression is greater than the forces occurring during utilization of the pressure sensor, the metal structure can retain permanent intervals between metal bumps 11 or rings 13, 14, since no further impression will then occur due to forces during operation.

Impression can, however, also take place with relatively low forces, in such a way that metal bumps 11 or rings 13, 14 expand laterally to the point that they touch one another at least partially. The force required for further impression would thereby be greatly increased, so that impression with the low applied force is stopped. Forces greater than those needed for the initial impression can then be detected by the pressure sensor in use.

What is claimed is:

1. A pressure sensor for detecting pressure in the combustion chamber of an internal combustion engine, the pressure sensor comprising:

a pressure plunger having an end made of a material having a first hardness, the pressure plunger being displaced by a force being measured by the pressure sensor;

a support;

a sensor membrane, the sensor membrane deflectable with respect to the support, the end of the pressure plunger being displaced onto the sensor membrane thereby causing a deflection of the sensor membrane with respect to the support, the deflection generating an analyzable measurement signal corresponding to the force;

a metal structure having a second hardness, the second hardness being less than the first hardness, the metal structure being attached to the sensor membrane and residing between the sensor membrane and the end of the pressure plunger, the metal structure being exposed to an increased pressure by the end of the pressure plunger such that the metal structure is impressed plastically to correspond to a shape of a contact surface of the end, the metal structure thereby compensating for stress peaks due to contact surface irregularities of the end and compensating for angular errors of the end;

wherein the metal structure is applied to the sensor membrane galvanically.

2. The pressure sensor according to claim 1, wherein the metal structure is applied to the sensor membrane galvanically during a production process for a micromechanical structure.

3. The pressure sensor according to claim 1, wherein, before impression, the metal structure has a uniform thickness between 10 and 100 µm.

4. A pressure sensor for detecting pressure in the combustion chamber of an internal combustion engine, the pressure sensor comprising:

a pressure plunger having an end made of a material having a first hardness, the pressure plunger being displaced by a force being measured by the pressure sensor;

a support;

a sensor membrane, the sensor membrane deflectable with respect to the support, the end of the pressure plunger being displaced onto the sensor membrane thereby causing a deflection of the sensor membrane with respect to the support, the deflection generating an analyzable measurement signal corresponding to the force;

a metal structure having a second hardness, the second hardness being less than the first hardness, the metal structure being attached to the sensor membrane and residing between the sensor membrane and the end of the pressure plunger, the metal structure being exposed to an increased pressure by the end of the pressure plunger such that the metal structure is impressed plastically to correspond to a shape of a contact surface of the end, the metal structure thereby compensating for stress peaks due to contact surface irregularities of the end and compensating for angular errors of the end;

wherein the metal structure is formed as a grid on the contact surface of the sensor membrane, with metal elevations and intervals forming a plurality of metal bumps uniformly distributed over the contact surface of the sensor membrane.

5. The pressure sensor according to claim 4, wherein a ratio between a surface area of the metal elevations and a surface area of the intervals is defined, prior to impression, such that after impression, at least one of the intervals are closed and impression is thereby stopped.

6. A pressure sensor for detecting pressure in the combustion chamber of an internal combustion engine, the pressure sensor comprising:
- a pressure plunger having an end made of a material having a first hardness, the pressure plunger being displaced by a force being measured by the pressure sensor;
- a support;
- a sensor membrane, the sensor membrane deflectable with respect to the support, the end of the pressure plunger being displaced onto the sensor membrane thereby causing a deflection of the sensor membrane with respect to the support, the deflection generating an analyzable measurement signal corresponding to the force;
- a metal structure having a second hardness, the second hardness being less than the first hardness, the metal structure being attached to the sensor membrane and residing between the sensor membrane and the end of the pressure plunger, the metal structure being exposed to an increased pressure by the end of the pressure plunger such that the metal structure is impressed plastically to correspond to a shape of a contact surface of the end, the metal structure thereby compensating for stress peaks due to contact surface irregularities of the end and compensating for angular errors of the end;
- wherein the metal structure is formed as a plurality of concentrically arranged rings, the plurality of concentrically arranged rings being formed by a plurality of metal elevations and intervals.

7. The pressure sensor according to claim 6, wherein a ratio between a surface area of the metal elevations and a surface area of the intervals is defined, prior to impression, such that after impression, at least one of the intervals are closed and impression is thereby stopped.

* * * * *